(12) United States Patent
González Moreno

(10) Patent No.: US 8,746,233 B2
(45) Date of Patent: Jun. 10, 2014

(54) SOLAR TRACKER WITH PARABOLIC CONCENTRATOR

(75) Inventor: José Abel González Moreno, Fustiñana (ES)

(73) Assignee: Mecanizados Solares, S.L., Fustinana (Navarra) (ES)

( * ) Notice: Subject to any disclaimer, the term of this patent is extended or adjusted under 35 U.S.C. 154(b) by 1265 days.

(21) Appl. No.: 12/605,189

(22) Filed: Oct. 23, 2009

(65) Prior Publication Data

US 2010/0326426 A1 Dec. 30, 2010

(30) Foreign Application Priority Data

Jun. 25, 2009 (ES) .................................. 200901490

(51) Int. Cl.
*F24J 2/12* (2006.01)
*G02B 5/10* (2006.01)

(52) U.S. Cl.
USPC ........... 126/600; 126/424; 126/438; 126/425; 126/625; 350/292; 350/636; 353/3; 250/203.4

(58) Field of Classification Search
USPC .......... 126/600, 424, 438, 425; 350/636, 292; 353/3; 250/203.4
See application file for complete search history.

(56) References Cited

U.S. PATENT DOCUMENTS

| 811,274 | A | * | 1/1906 | Carter ........................... 126/684 |
| 3,466,119 | A | * | 9/1969 | Francia ......................... 359/851 |
| 4,110,010 | A | * | 8/1978 | Hilton ........................... 359/853 |
| 4,172,443 | A | * | 10/1979 | Sommer ....................... 126/680 |
| 4,272,443 | A | * | 6/1981 | Titzenthaler et al. .......... 549/537 |
| RE30,960 | E | * | 6/1982 | Sommer ....................... 126/578 |
| 4,583,520 | A | | 4/1986 | Dietrich et al. |
| 5,114,101 | A | * | 5/1992 | Stern et al. ................. 244/172.8 |
| 5,325,844 | A | | 7/1994 | Rogers et al. |
| 6,485,152 | B2 | * | 11/2002 | Wood ............................ 359/853 |

FOREIGN PATENT DOCUMENTS

WO 2008126117 10/2008

* cited by examiner

*Primary Examiner* — Steven B McCallister
*Assistant Examiner* — Nikhil Mashruwala
(74) *Attorney, Agent, or Firm* — Lucas & Mercanti, LLP

(57) ABSTRACT

The invention relates to a solar tracker with parabolic concentrator, comprising a parabolic concentrator (1) formed by a composition of mirrors (4) focused towards a Stirling engine (3), the mirrors (4) being located on a bearing structure (5), with securing by means of anchors (6) which allow a regulation in a vertical direction, in a lateral direction and in a depth direction, whereas the Stirling engine (3) is secured on the same bearing structure (5) by means of ties (10) which are attached to said Stirling engine (3) by means of two securing elements which can be adjusted in length, the bearing structure (5) being formed by parallel vertical lattices (14) comprising in their formation sheet metal boxes attached to one another by means of other intermediate sheet metal boxes.

2 Claims, 6 Drawing Sheets

SOLAR TRACKER WITH PARABOLIC CONCENTRATOR

CROSS REFERENCE TO RELATED APPLICATIONS

This Application claims the benefit of priority of Spanish Patent Application No. : 200901490 filed Jun. 25, 2009 the entire contents of which are hereby incorporated by reference.

FIELD OF THE ART

The present invention relates to the use of solar radiation for generating consumable energy forms, proposing a solar tracker incorporating a parabolic mirror concentrator to project the solar radiation onto a Stirling engine, with structural formation features improving the regulation of the position of the mirrors and of the Stirling engine, as well as the features of the bearing structural assembly.

STATE OF THE ART

In the field of the use of solar energy for generating consumable energies, such as electric energy or heat energy, the arrangement of parabolic concentrators formed by mirrors to collect the solar radiation and project it towards an energy-converting element such as, for example, an electricity-generating Stirling engine, is known.

The arrangement of solar concentrators of this type in a mobile assembly on a support, with movement in one or two axes to track the sun's path for the purpose of achieving the maximum capture of solar radiation at all times during the hours of the day, is also known.

For the effectiveness of these arrangements, the position of the mirrors of the parabolic concentrator, as well as the placement of the energy-converting element facing said parabolic concentrator is extremely important for which complicated and expensive solutions have been developed, with which, however, the problem is not satisfactorily solved.

The formation of the structural assembly on which the assembly of the component mirrors of the parabolic concentrator is arranged is also very important, since it must be a rigid structure to maintain the mirrors fixed and resist the wind incidence stresses that the structural assembly has to withstand in the arrangement of application, and it must furthermore be a structure that is as lightweight as possible, to simplify the assembly and the effectiveness of movements of the solar tracker assembly on the bearing support.

OBJECT OF THE INVENTION

According to the invention a solar tracker is proposed which incorporates a parabolic concentrator to project solar radiation onto a Stirling engine arranged facing it, with an embodiment of advantageous features in the assembly of the mirrors and of the Stirling engine, as well as in the formation of the bearing structure.

The parabolic concentrator consists of a distribution of mirrors which are secured on a bearing structure, forming a parabolic composition with respect to a focusing point at which the Stirling engine is located, said Stirling engine being secured by means of ties which are fastened on the same bearing structure for the mirrors of the parabolic concentrator.

According to the invention, the component mirrors of the parabolic concentrators are secured by means of anchors formed by a plate to which the corresponding mirror is fixed, angle bars being attached to the rear part of said plate by means of screwed securing elements sliding in a vertical direction, which angle bars are in turn secured by means of screwed securing elements sliding in a depth direction and in a lateral direction on a profile which is secured to the bearing structure.

A securing of the mirrors is thus obtained which allows individually regulating the position of each mirror in a vertical direction, in a lateral direction and in a depth direction, for the correct orientation in relation to the focusing towards the convergence point of the parabolic concentrator, the position of the mirrors on the bearing structure being able to be adjusted before incorporating said structure on the mobile assembly in the solar tracker, which facilitates the constructive formation of the assembly.

The ties supporting the Stirling engine are attached to said engine by means of tensioners which can be regulated in length, which establish pivoting attachments with respect to the engine and with respect to the corresponding tie, such that the position and orientation of the Stirling engine in relation to the parabolic concentrator can be adjusted with precision by means of regulating the tensioners of the different ties.

The bearing structure for the component mirrors of the parabolic concentrator consist of parallel vertical lattices, which are structured with a sheet metal box integrated in the middle area thereof, said lattices being in turn attached by means of intermediate sheet metal boxes intercalated between the structural boxes thereof, which determines a structural assembly which is very resistant to torsions, both in the formation of the component lattices and in the attachments between said lattices.

Therefore, the proposed solar tracker has truly advantageous features, acquiring its own identity and a preferred character with respect to the conventional solutions of solar trackers with the same application.

DETAILED DESCRIPTION OF THE INVENTION

The object of the invention relates to a solar tracker formed by a parabolic concentrator (1) incorporated in a solar tracking assembly on a supporting column (2), with a Stirling engine (3) located at a focusing point of the projection of said parabolic concentrator (1), which is made up of a distribution of mirrors (4), each of them placed individually in an orientation of reflection towards the Stirling engine (3).

Figure 1:
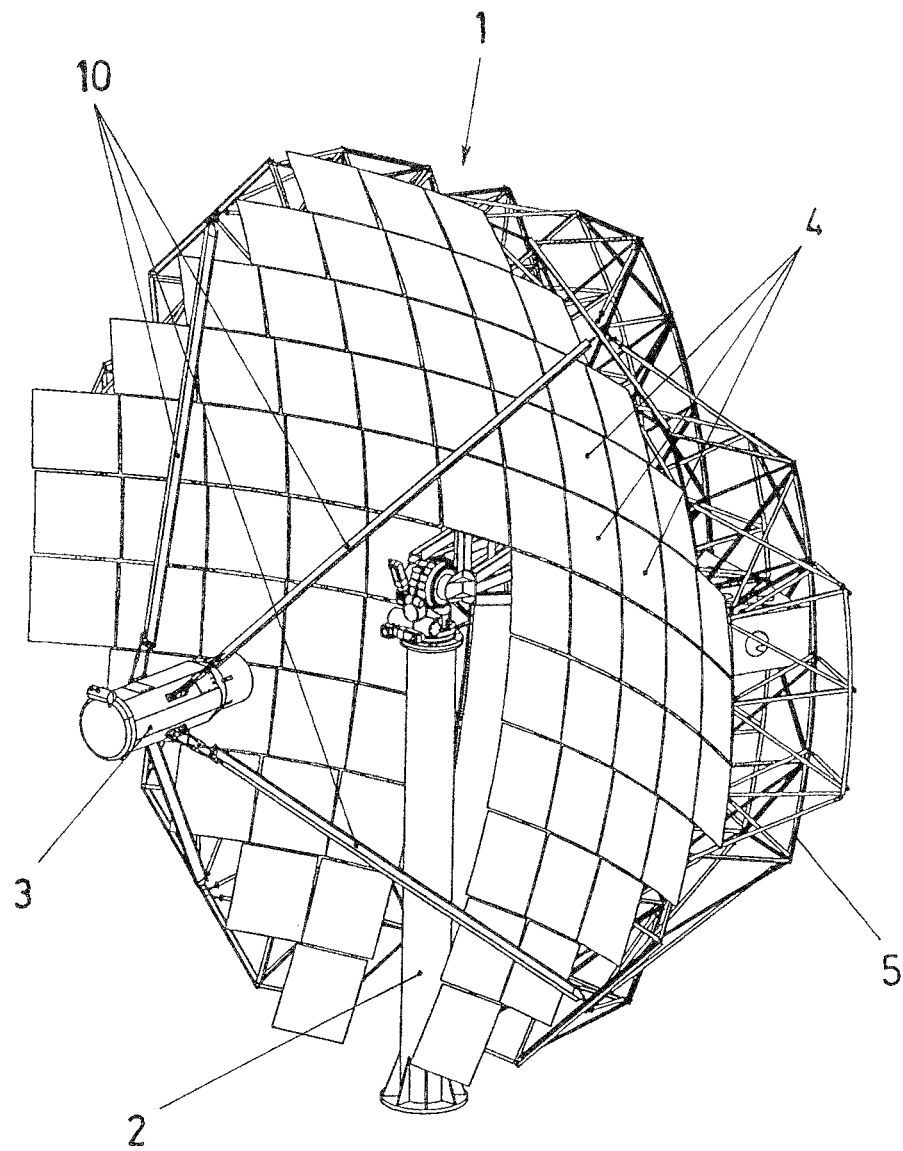
FIG. 1 shows a front perspective view of a solar tracker according to the object of the invention.
Figure 2:
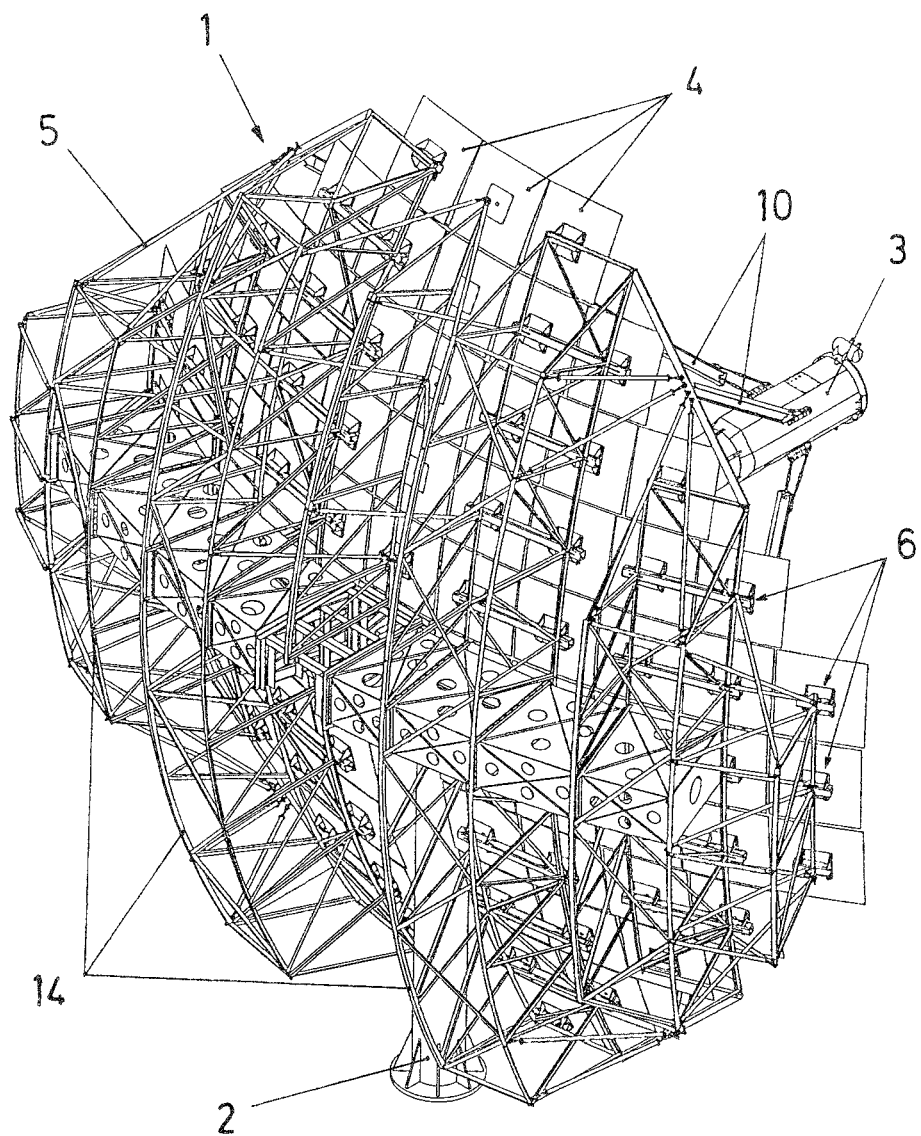
FIG. 2 is a perspective view of the same solar tracker observed from the rear part.
Figure 3:
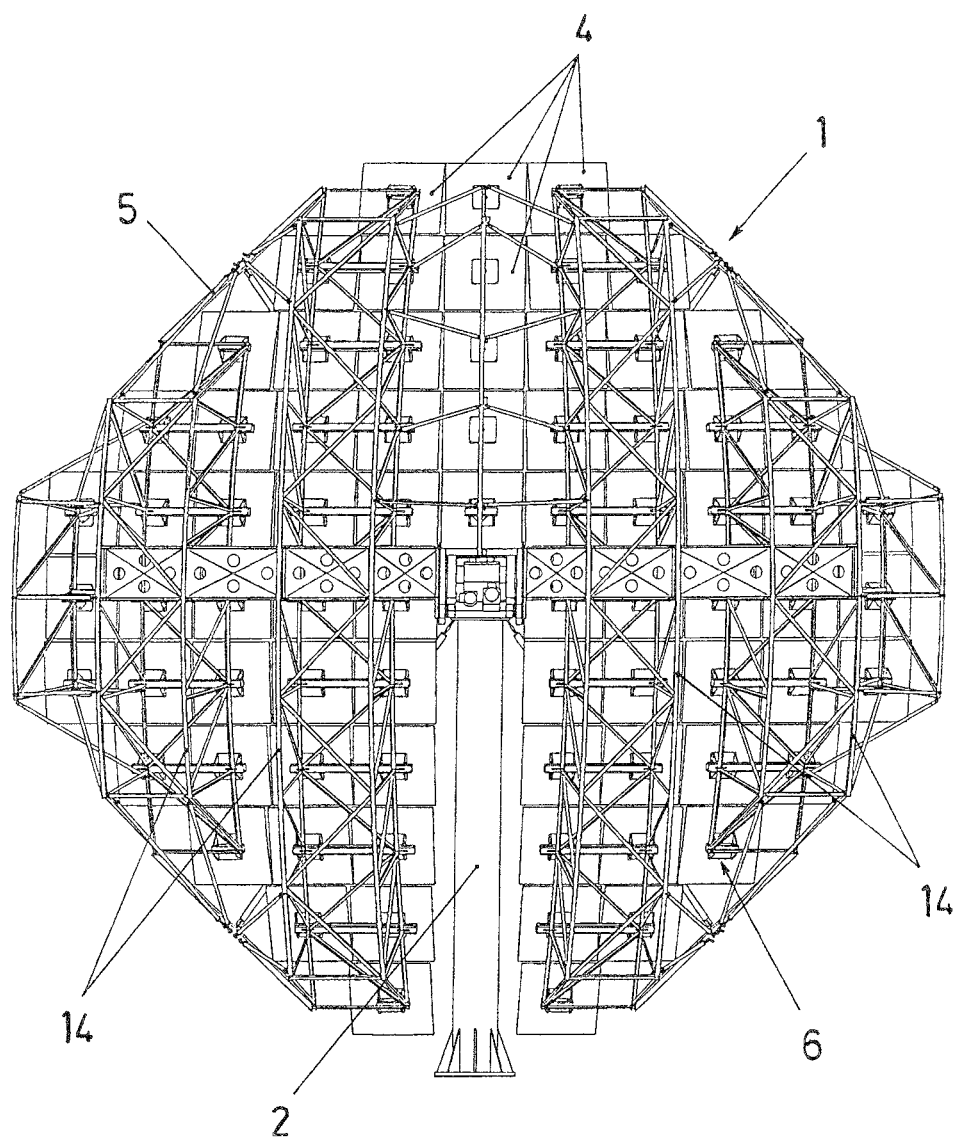
FIG. 3 is a rear frontal view of the same solar tracker.
Figure 6:
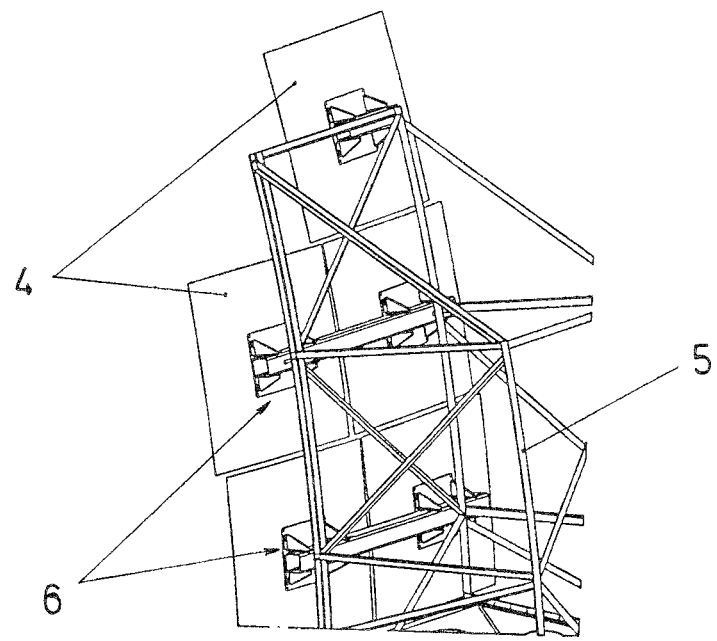
FIG. 6 is an enlarged detail of a partial area of the bearing structure for the mirrors of the parabolic concentrator of the solar tracker.

The mirrors (4) are secured on a bearing structure (5) acting as a structural framework of the parabolic concentrator (1), each mirror (4) being secured individually by means of anchors (6), as observed in FIGS. 2 and 6.

Figure 7:
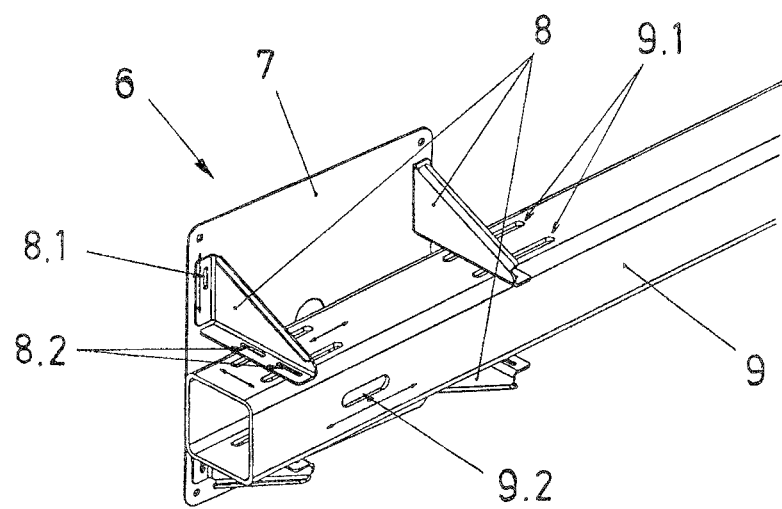
FIG. 7 is an enlarged detail of an anchor for securing the mirrors of the parabolic concentrator.
Figure 8:
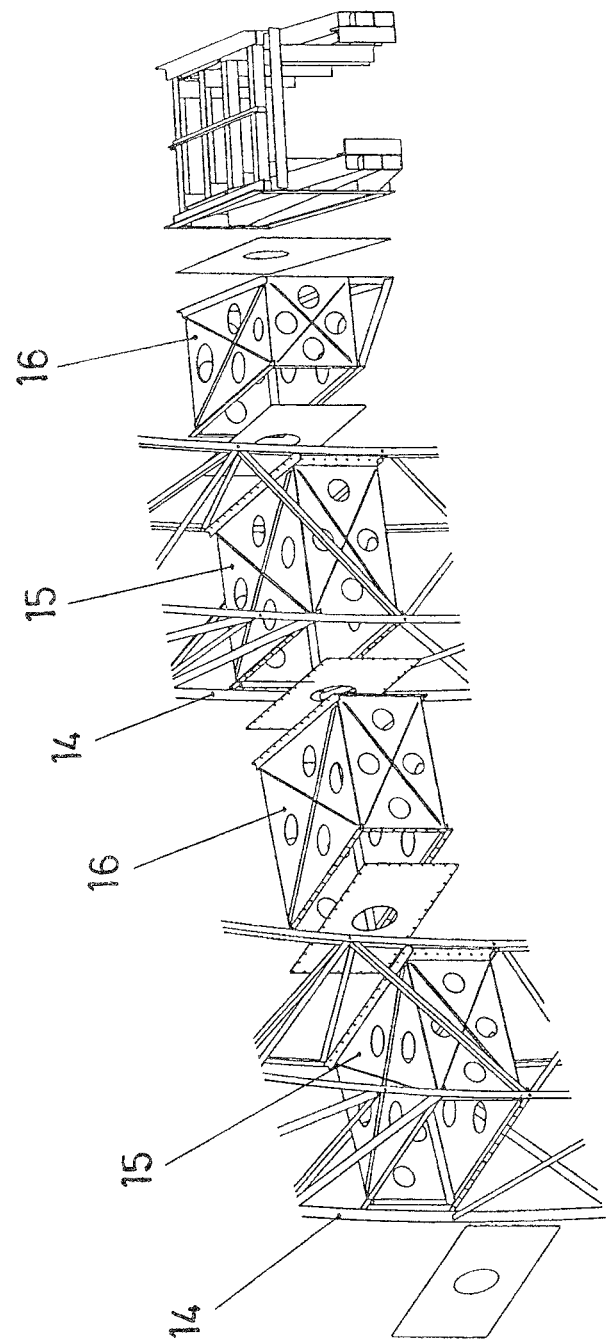
FIG. 8 is an exploded partial perspective view of the formation of the constructive structure of the parabolic concentrator.

As observed in FIG. 7, each of said anchors (6) comprises a plate (7) on which the corresponding mirror (4) is secured in the front part, whereas angle bars (8) are attached to said plate (7) at the rear part, which angle bars are secured by means of fasteners screwed through holes (8.1) slit in a vertical direction, which allow a sliding securing of said fasteners in this vertical direction.

The angle bars (8) are attached to a profile (9) which is secured to the bearing structure (5), the angle bars (8) being secured on the profile (9) by means of fasteners screwed through holes (8.2) slit in a depth direction, of the angle bars (8) themselves, and through holes (9.1) slit in a lateral direction, of the profile (9) such that these fasteners in turn allow a regulation in said depth and lateral directions.

The securing of each mirror (4) thus allows a regulation in a vertical direction, in a lateral direction and in a depth direction, allowing easily adapting the position of the corresponding mirror (4) in the orientation of focusing towards the convergence point of the parabolic concentrator (1).

The anchors (6) of the mirrors (4) can be individual on a respective profile (9), but one and the same profile (9) can also be used in order to establish thereon the anchors (6) of two or more mirrors (4), the profiles (9) being secured on the bearing structure (5) by means of screwed fasteners which are in turn established through slit holes (9.2), which allow centering said fasteners for securing the assembly on the bearing structure (5).

Figure 4:
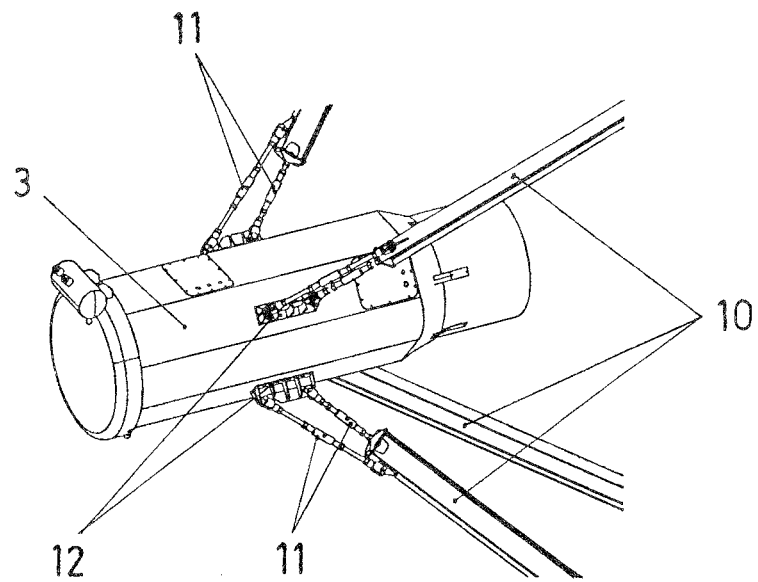
FIG. 4 is an enlarged detail of the securing of the Stirling engine in the solar tracker of the invention.
Figure 5:
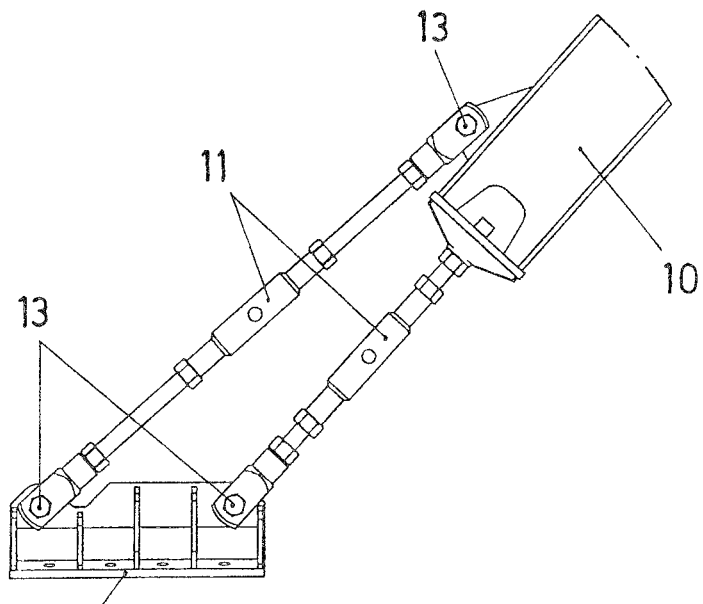
FIG. 5 is an enlarged side view of the end of a tie for securing the Stirling engine.

The Stirling engine (3) is secured by means of ties (10) to the actual bearing structure (5) supporting the mirrors (4) of the parabolic concentrator (1), each of the ties (10) being attached to the Stirling engine (3) by means of two tensioners (11) which can be regulated in length, which are attached to the respective tie (10) and to a plate (12) for fixing on the Stirling engine (3), by means of pivoting attachments (13), as observed in FIGS. 4 and 5.

The assembly of the Stirling engine (3) is thus easy to carry out in the suitable placement and orientation with respect to the parabolic concentrator (1), since the position of said Stirling engine (3) in the assembly can be adjusted with precision by means of the longitudinal regulation of the tensioners (11).

The bearing structure (5) on which the mirrors (4) and the Stirling engine (3) are supported consists of a formation made up of parallel vertical lattices (14), which are structured with a sheet metal box (15) included in the middle area thereof, an attachment between the mentioned lattices (14) being in turn established by means of other intermediate sheet metal boxes (16) which are attached to the mentioned boxes (15) of the structural formation of said lattices (14).

The bearing structure (5) thus has a formation which is very resistant to torsion stresses, both in the formation of the component lattices (14) and in the composition of said bearing structure (5) as a whole.

The invention claimed is:

1. A solar tracker comprising:
a parabolic concentrator comprising a plurality of mirrors focused toward a common point at which a Stirling engine is arranged;
wherein each of the plurality of mirrors is individually secured on a bearing structure by an anchor adjustable in a vertical direction, in a lateral direction and in a depth direction;
wherein the Stirling engine is secured on the bearing structure by a plurality of ties, each tie being attached to the Stirling engine by two securing elements adjustable in length;
wherein the bearing structure comprises a plurality of parallel vertical lattices, the plurality of parallel vertical lattices comprising a formation that includes respective sheet metal boxes, wherein sheet metal boxes are disposed between respective lattices, the respective lattices establishing an attachment between the sheet metal boxes;
wherein each anchor comprises a plate to which a corresponding mirror is fixed, wherein a plurality of angle bars are attached to a rear side of the plate by a plurality of first fasteners screwed through respective first slits oriented in a vertical direction, wherein the plurality of angle bars are further attached to a profile by second fasteners screwed through respective second slits oriented in a depth direction and through respective third slits oriented in a lateral direction, the profile being secured to the bearing structure.

2. The solar tracker according to claim 1, wherein each of the securing elements comprises a plurality of tensioners adjustable in length, the tensioners being attached by one or more pivoting attachments to a respective tie and to a respective second plate fixed to the Stirling engine.

* * * * *